United States Patent
Kleyman et al.

(10) Patent No.: US 9,919,847 B2
(45) Date of Patent: Mar. 20, 2018

(54) INTEGRATED SQUEEZABLE DISPENSING CONTAINER

(71) Applicants: Gennady I Kleyman, Brooklyn, NY (US); Yuriy Chernov, Brooklyn, NY (US)

(72) Inventors: Gennady I Kleyman, Brooklyn, NY (US); Yuriy Chernov, Brooklyn, NY (US)

(73) Assignee: Klecher, L.L.C., Wilmington, DE (US)

( * ) Notice: Subject to any disclaimer, the term of this patent is extended or adjusted under 35 U.S.C. 154(b) by 1 day.

(21) Appl. No.: 15/169,899

(22) Filed: Jun. 1, 2016

(65) Prior Publication Data
US 2017/0349334 A1    Dec. 7, 2017

(51) Int. Cl.
| | |
|---|---|
| *B65D 35/28* | (2006.01) |
| *B65D 35/08* | (2006.01) |
| *B65D 35/06* | (2006.01) |
| *B65D 35/14* | (2006.01) |
| *B32B 3/26* | (2006.01) |
| *B32B 1/08* | (2006.01) |

(52) U.S. Cl.
CPC ............... *B65D 35/28* (2013.01); *B32B 1/08* (2013.01); *B32B 3/266* (2013.01); *B65D 35/06* (2013.01); *B65D 35/08* (2013.01); *B65D 35/14* (2013.01); *B32B 2323/04* (2013.01); *B32B 2439/00* (2013.01); *B65D 2203/02* (2013.01); *B65D 2255/20* (2013.01)

(58) Field of Classification Search
CPC ........ B65D 35/18; B65D 35/06; B65D 35/14; B65D 35/08; B65D 35/10; B65D 35/28; B32B 1/08; B32B 3/266; B32B 2323/04; B32B 2439/00

USPC .................. 222/105, 103, 107, 95
See application file for complete search history.

(56) References Cited

U.S. PATENT DOCUMENTS

| | | | | |
|---|---|---|---|---|
| 2,980,963 A | * | 4/1961 | Makowski | ............... B26D 3/16 264/132 |
| 3,211,342 A | * | 10/1965 | De Wayne Miles | ... B65D 35/18 222/107 |
| 4,448,333 A | * | 5/1984 | Ferrari | ................... B65D 35/28 222/103 |
| 4,579,254 A | * | 4/1986 | Puskarcik | ............ B65D 35/245 222/103 |
| 4,733,800 A | * | 3/1988 | Bjorkengren | ......... B29C 53/382 138/138 |
| 5,322,658 A | * | 6/1994 | Holoubek | ............... B32B 27/08 264/150 |
| 6,302,298 B1 | | 10/2001 | Chernov et al. | |

(Continued)

*Primary Examiner* — Charles P Cheyney

(57) ABSTRACT

An elongated tubular housing adapted to receive an adjustable external compression device introduced on one end of the tubular housing distal from the opening releasing the contents, and retained in position by a member engaging a grooved strip that is integrated with and/or retained on the housing surface material with a strip surface of like material, providing a reliable, economic and functional outer compression member retention apparatus and method. Further embodiments according to the present invention include a dispenser having regions provided for ease and comfort of gripping, grooved strip end-stop to retain compression device, and grooved strip dimensional and placement details to provide functional, manufacturable and economic material dispenser.

20 Claims, 4 Drawing Sheets

(56) References Cited

U.S. PATENT DOCUMENTS

| | | |
|---|---|---|
| 6,851,577 B2 | 2/2005 | Kleyman et al. |
| 8,517,218 B2 | 8/2013 | Cherov et al. |
| 2005/0029294 A1* | 2/2005 | Jackson ................ B65D 35/18 222/95 |

* cited by examiner

US 9,919,847 B2

INTEGRATED SQUEEZABLE DISPENSING CONTAINER

FIELD OF THE INVENTION

The preset invention relates fluid or semi-fluid material containers formed to provide selective material dispensing, in particular, to deformable fluid containers including structure that maintain deformation after selective dispensing.

BACKGROUND OF THE INVENTION

Deformable material dispensing containers, typically tubular or other shaped housings having an openable restriction (e.g. Cap, such as a flat style, a fez style or a pedestal style) at one end and being sealed at the other end, include material therein that can be displaced through the openable restriction when the material dispenser (e.g. the 'tube') is deformed, such as by squeezing, which temporarily diminishes the volume of the housings to urge the contained included material out through the openable restriction. However, owing to the housing material and/or geometrical configuration, the housing tends to return to the original configuration or volume, delaying or interfering with subsequent dispensing of the included material.

External dispenser compression devices applied to the housing distal from the openable restriction to maintain prior housing deformations require specific modification or construction of the housing to connect to and operate which may undesirably raise the costs, complexity and/or formation of the housing to receive external devices or use housings (e.g. tubes) currently commercially available.

SUMMARY OF THE INVENTION

The present invention provides embodiments which provide and adjustable external compression device introduced on the housing distal from the opening releasing the content, and retained in position by engaging a grooved strip integrated with and/or retained on the housing surface material with a strip surface of like material, providing a reliable, economic and functional outer compression member retention apparatus and method.

Embodiments according to the present invention include a dispenser having regions provided for ease and comfort of gripping, grooved strip end-stop to retain compression device, and grooved strip dimensional and placement details to provide functional, practically manufacturable and economic material dispenser.

BRIEF DESCRIPTION OF THE DRAWING

These and further details of the present invention will be better understood by reading the following Detailed Description, taken together with the Drawing, wherein.

DETAILED DESCRIPTION

Figure 1:
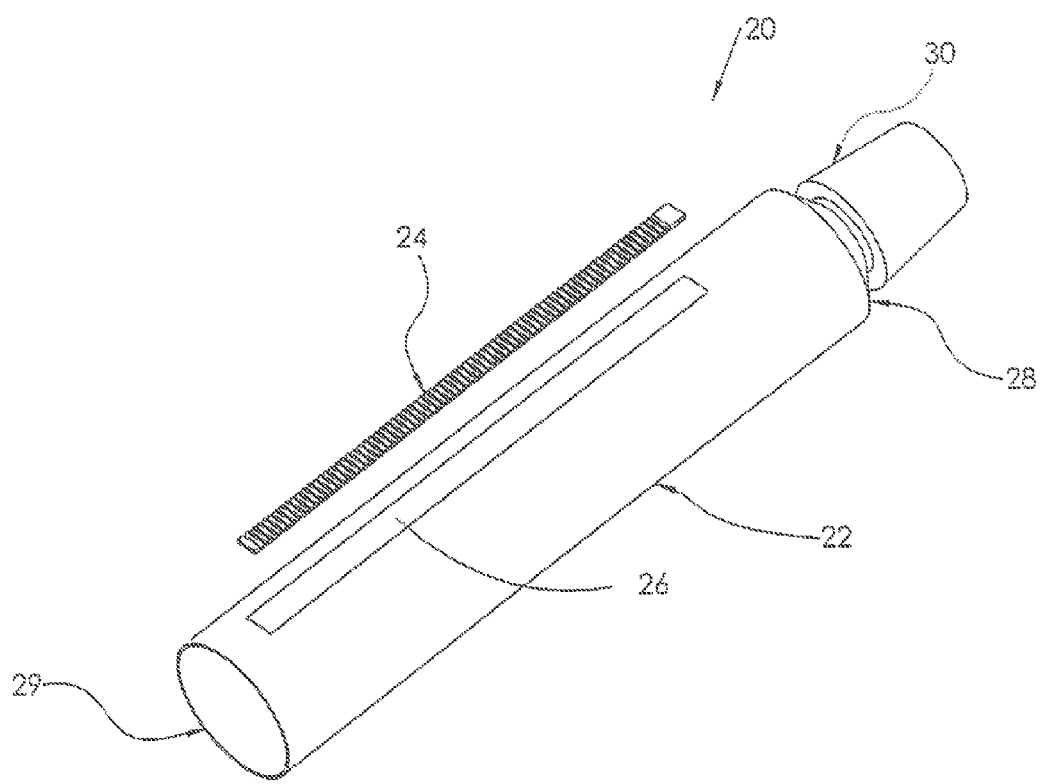
FIG. 1 is an exploded perspective view of container according to one embodiment of the present invention, without material inside, with unattached grooved strip.

An exemplary deformable (squeezable) material dispensing container 20 is shown in FIG. 1, wherein a tubular housing container 22 having a length and a prepared region 26 disposed therealong to receive and be bonded to an elongated grooved or otherwise varied surface strip 24 which extends along the length of the housing container 22 toward an end 28 having an opening, e.g. an extension and mating removable cap 30, thereon through which material contained within the housing container is dispensed when the housing 22 is compressed. The elongated grooved strip 24 is shown as bonded to the tubular container 22 in FIG. 7.

Figure 2:
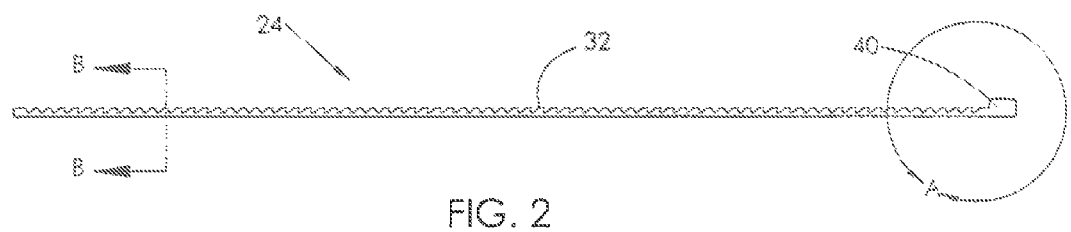
FIG. 2 is a side view of one embodiment of the grooved strip.
Figure 3:
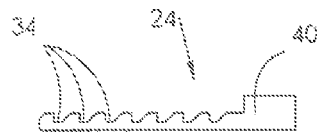
FIG. 3 is an enlarged view A taken from the grooved strip of FIG. 2.

A side view of an exemplary strip 24 is shown in FIG. 2, which strip 24 provides an engagement surface 32 with which a compression member 70 (FIG. 7) engages, wherein the engagement surface is varied, such as the periodically spaced grooves 36 shown in profile in FIG. 3. Other engagement surfaces are envisioned as may engage and retain the compression member 70. The strip 24 includes a terminal stop 40 having a greater thickness (i.e. vertical in FIGS. 2 and 3) dimension to engage and impede further motion of the compression member 70 along the strip 24. Typically the material 46 engaging the compression member 70 is selected for suitable strength and the material 42A is selected to be compatible with the selected form of bonding to the prepared region 26.

Figure 4:
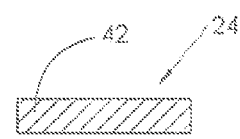
FIG. 4 is a cross-section B-B from strip of FIG. 3 comprising a single (mono-) material grooved strip.
Figure 5:
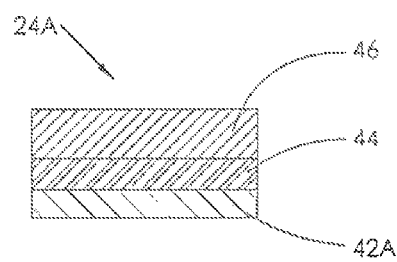
FIG. 5 is a cross-section B-B from the strip of FIG. 3 comprising a grooved strip having different materials.

The elongated strip 24 typically comprises a material 42, shown in cross-section in FIG. 4, compatible with bonding (e.g. ultrasonic welding, glue or fabricated by co-extrusion) to the housing container prepared region 26, of a single type, or alternately, a multi-layered structure 24A shown in FIG. 5, which includes a material 42A, e.g. polyethylene, compatible with bonding (e.g. ultrasonic welding) one surface to the housing container prepared region 26, and another surface material 46 with which the compression member 70 engages, of another material, e.g. nylon, either directly or with an interposed bonding material 44, e.g. an adhesive resin such as ethylene copolymers produced by DuPont Corporation, where the stop 40, if provided, would be would be included in or formed on the surface material 46. Typically the material 46 engaging the compression member 70 is selected for suitable strength and the material 42A is selected to be compatible with the selected form of bonding to the prepared region 26.

Figure 6:
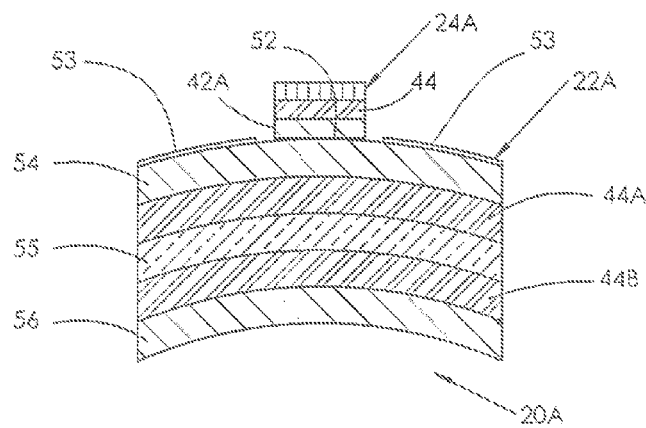
FIG. 6 is a cross-section of an exemplary tubular housing joined to the grooved strip of FIG. 5.

A cross-section of an exemplary bonded assembly 20A is shown in FIG. 6, comprising a shown portion 22A of an exemplary housing container 22 (FIG. 1), and an exemplary multi-layered strip 24A, bonded together 52, e.g. by ultrasonic welding or other manner of permanently bonding the outer material layer 54 and the strip 24A lower layer 42A. In one embodiment, the housing container 20A comprises a multi-layered structure having layers 54, 55, 56 bonded together directly or with an intervening adhesive 44A, 44B, such as an aluminum-plastic laminated tube including polyethylene/adhesive resin/aluminum foil/adhesive resin/polyethylene (inner-to-outer layers). Such laminate tubes can be manufactured (e.g. by providing as a flat sheet then welding into a tubular shape) by using the laminate feed stock that is simply a poly-foil-poly structure that has polyethylene on either side (54, 56) of a thin gauge of foil (55). Alternately, single material 54 housing containers, e.g. plastic tube containers (not shown), most commonly PE (polyethylene) fabricated by extrusion can also be used wherein a bond 52 is provided between the facing surfaces 42A of the strip 24A (or 42 of a single type strip 24) and 54 of the housing container of compatible or identical materials. The bond 52 is provided within the prepared region 26 of the housing container 22, 22A wherein an outer coating 53 such as ink including decorations, graphics and/or text thereon, is formed with an aperture to reveal the underlying outer layer 54 permitting the bonding to the strip 24 or layer 42A. Other combinations of strip 24 layer 42A and housing container 22A outer layer 54, such as nylon/adhesive resin/polyethlene are included. The ink outer coating 53 may inhibit reliable bonding (e.g. ultrasonic welding) of the strip 24 to the outer layer 54, and is therefore absent (shown as aperture revealed region 26) permitting reliable joining without an interposed ink layer.

Alternate embodiments include housing containers 22 formed with the graphics as part of the laminate feedstock material with either letterpress or rotogravure printing. Rotogravure printing is used extensively to provide a high quality print buried within the outer layer of laminate structure (e.g. shown in FIG. 6). Letterpress printing is used to decorate the surface of the laminate feedstock just prior to forming the tubular housing container 22. In formation, after laminated tube sheet stock (nor shown) is rolled to the desired size. Heat generated by a high frequency source fuses the sides of the material together to form a solid cylindrical tube. After the tube has been formed into the desired cylindrical shape and length, the tube is transferred to the heading (a transitional area for the end of the tube 28 to receive a cap) operation. As with plastic tubes, several heading methodologies are available. After the complete tube has been formed, it goes to the capping station where a cap 30 is applied. After tube completely formed with a printed outer layer or a painted layer 53 added, it goes to filling station where material 80 added to the tube thru the open end 29 (end without cap) and after this this end welded by using ultrasound welding machine to form the sealed end region 62.

If plastic tubes 22 are used, the manufacturing process is typically composed of four steps: extrusion, heading, decorating, and finally capping. The first phase of the manufacturing process is extrusion. A mixture of resin and color concentrate is placed into an extruder hopper. The extruder is temperature controlled as the resin is fed through to ensure proper melt of the resin. The material is extruded through a set of sizing dies that are encapsulated within a right angle cross section attached to the extruder. Thereafter, the prepared tubular housing members 22 are decorated such as by rotogravure printing.

Figure 7:
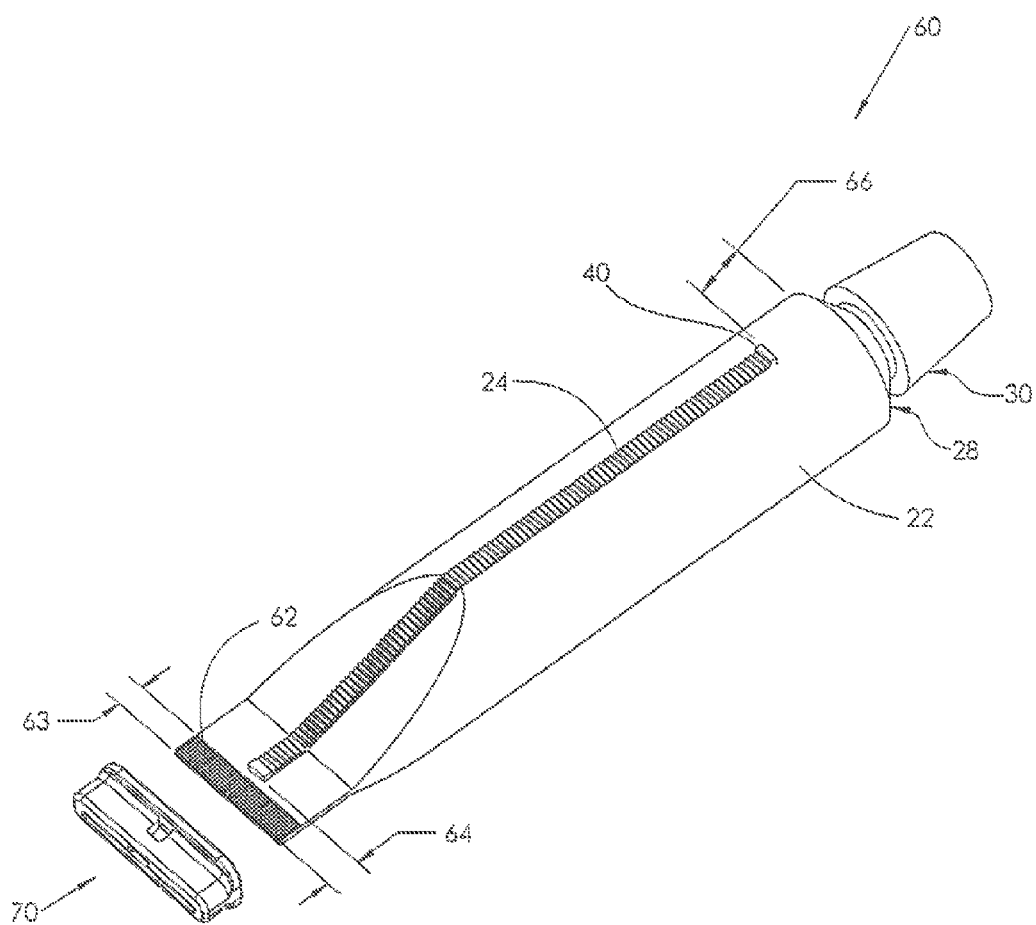
FIG. 7 is an exploded view of one embodiment of the squeezable container assembly.
Figure 8:
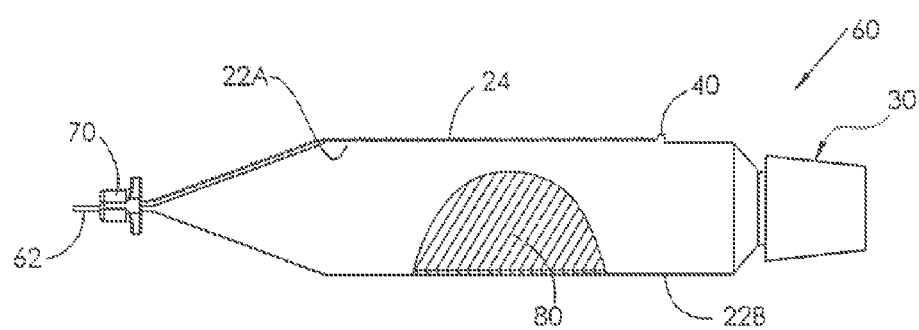
FIG. 8 is a side view partial cutaway of squeezable container assembly of FIG. 7.
Figure 9:
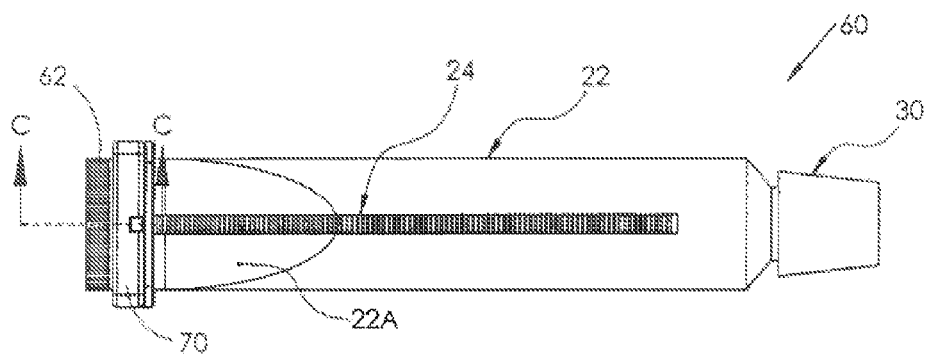
FIG. 9 is a top view of the squeezable container assembly of FIG. 7.

Further assembly of an exemplary embodiment 60 of the present invention is shown in FIG. 7-9, wherein the housing container end 29 distal from the cap 30, is externally compressed and joined (e.g. by ultrasonic welding) to form an elongated and flattened terminal strip 62 having a width 63 less than a distance 64 between the end of grooved strip 24 (opposite from the end having stop 40) and the outer end of the strip 62. Grooved strip 24 is attached to the housing container 22 before the contained material (80) is filled into the housing container. The typical average width of the tube end 63 weld is from 0.25" to 0.50" and formed after contained material is filled into the housing container 22. The start location 64 of the strip 24 location on the housing container (relative to the filled end 29) is preferably greater than the dimension of the weld 53 by 50% to avoid any welding heat to undesirably affect the joining of the strip 24 to the body of the housing container 22.

A substantially continuous compression member 70 having an elongated opening sufficient dimension to receive the joined region 62 and housing container sides 22A and 22B therein, and a further expanded opening sufficient to receive the elongated strip 24 thickness dimension (extending away from the housing container sides 22A) in addition to the housing container sides 22A and 22B, as shown in FIGS. 8-11, discussed below. The elongated strip is placed on the housing container 22 having spacing between the stop and the cap 30 end 28 of the housing container of distance 66, preferably 0.5" to 1.0", to accommodate the majority of finger sizes to allow a comfortable squeezing action on the housing container providing enhanced user control of the present apparatus to fully expel the contents 80.

A fluid or semi-fluid substance or material 80 is contained within the container 22 having sides 22A and 22B, and between the cap 30 opening and sealed opposite end 29, and is advanced through the cap 30 (when opened) by incremental advancement of the compression member 70 from the strip 62 end 29 along the length of the housing container 22 toward the end 28 by user manipulation, until the compression member 70 abuts the stop 40. Further compression may be applied across the housing container 22 diameter by the user in the region 66 between the stop 40 and cap 30 end 28.

Figure 10:
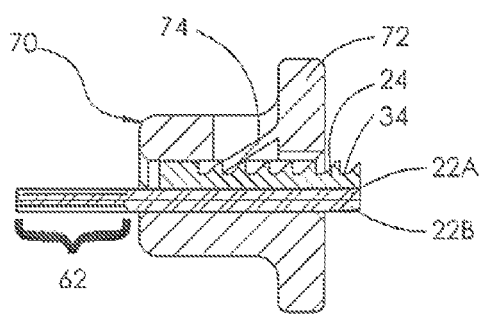
FIG. 10 is a sectional view C-C taken of the squeezable container assembly of FIG. 9 with the compression device located in the 'full' container position.
Figure 11:
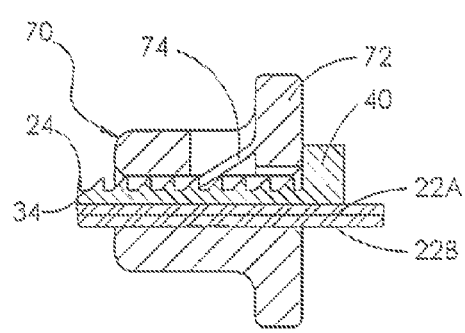
FIG. 11 is a sectional view C-C taken of the squeezable container assembly of FIG. 9, with the compression device located in a 'empty' position, engaging a stop.

Cross-sectional views of the compression member 70 as applied on the housing container at an end of the elongated strip 24 proximal the joined strip 62 and the stop 40 are shown in FIGS. 10 and 11, respectively, wherein the compression member applies a force against the two opposing sides 22A, 22B of the housing container 22 as the compression member is advanced, resulting in a flattened area over which the compression member 70 may continue to be advanced toward the stop 40. In one embodiment, the compression member includes a flange 72 to receive a user-applied force to urge the compression member toward the stop 40, and to further reinforce the dimensional shape and opening spacings of the compression member 70 as it receives resistance from evacuation of the contained material 80. To prevent reversal in direction along the elongated strip, a unidirectional (along the strip 24) gripping member, e.g. a downward-angled protrusion 74, biased to engage the grooves 34 (or other profile) on the surface in a direction opposing compression member 70 motion away from the stop by engagement of the grooves 34, permit motion toward the stop 40 by sliding over the walls of the grooves (or other elongated strip protrusions). In the exemplary embodiment, the compression member 70 ultimately comes to rest on the stop 40, and the remaining housing container 22 surfaces may be further compressed by the user as desired without encumbrance from the elongated strip 24. In an embodiment, the movement of compression member 70 protrusion along the elongated strip 24 grooves 34 produces a discernable (e.g. tactile) 'click' to the user.

These and further modifications and substitutions by one of ordinary skill in the art are within the scope of the present invention, which is not limited except by the claims that follow.

What is claimed is:

1. A dispensing container, comprising:
   a tubular housing enclosing a volume and having a length with a first end and a second end, and having an outer layer comprising a first material;
   an elongated strip having a length between a first end and a second end and a first layer of the same material as said housing outer layer and disposed on said housing along said housing length, and the elongated strip having a second layer of a material different from said strip first layer and bonded thereto; and
   a compression member disposed to engage housing first end and be disposed to engage said elongated strip second layer to be unidirectionally movable along said housing length, and provide compression to opposing outer surfaces of said housing along said length with advancement thereon to selectively reduce said housing volume.

2. The dispensing container of claim 1, wherein said elongated strip first layer is disposed in direct contact with said tubular housing outer layer.

3. The dispensing container of claim 1, wherein said tubular housing comprises a single material.

4. The dispensing container of claim 1, wherein said elongated strip first and second layers are bonded by bonding material therebetween.

5. The dispensing container of claim 1, wherein said elongated strip second layer comprises a non-uniform outer surface.

6. The dispensing container of claim 1, wherein said elongated strip has a length at least 0.5" less than said tubular housing length.

7. The dispensing container of claim 6, wherein
   said tubular housing first end comprises a sealed end region extending a distance from said first end toward said second end, and
   said elongated strip first end is bonded to said tubular housing at a first end space substantially 50 percent greater than said distance of said tubular housing sealed end region.

8. The dispensing container of claim 6, wherein said elongated strip second end is spaced from said tubular housing substantially 0.5" to 1.0".

9. The dispensing container of claim 1, wherein said elongated strip second end comprises a stop element disposed to inhibit said compression member movement thereover.

10. The dispensing container of claim 9, wherein
    said elongated strip comprises a thickness dimension extending away from said tubular housing,
    said compression member includes an aperture dimensioned to receive said elongated strip therethrough, and said stop element comprises a dimension, together with said elongated strip thickness, is greater than said compression member aperture.

11. The dispensing container of claim 1, wherein
    said tubular housing first end comprises a sealed end region extending a distance from said first end toward said second end, and
    said compression member comprises an aperture dimensioned to receive said sealed end region therethrough and a region within said aperture of greater dimension to receive at least a portion of said elongated strip therethough.

12. The dispensing container of claim 11, wherein said compression member further includes a unidirectional gripping member disposed to engage said elongated strip second layer favoring motion of said compression member toward said tubular housing second end and inhibiting motion of said compression member toward said tubular housing first end.

13. The dispensing container of claim 1, wherein said elongated strip is welded to said tubular housing.

14. The dispensing container of claim 1, further comprising an outer covering surrounding said tubular container outer layer and having an elongated aperture, wherein said elongated strip is joined to said tubular container outer layer within said elongated aperture.

15. The dispensing container of claim 14, wherein said outer covering includes at least one of decorative, graphical, and text images.

16. The dispensing container of claim 14, wherein said outer covering comprises ink.

17. The dispensing container of claim 1, wherein at least one of said tubular container outer layer and said elongated strip first layer comprises polyethylene.

18. The dispensing container of claim 1, wherein said elongated strip second layer comprises nylon.

19. The dispensing container of claim 1, wherein said elongated strip second layer includes grooves therein extending transverse to said elongated strip length.

20. A dispensing container, comprising:
    a tubular housing enclosing a volume and having a length with a first end and a second end, and having an outer layer comprising a first material, and an ink layer thereon including an aperture to reveal said outer layer at least partially along said length;
    an elongated strip having a length between a first end and a second end and a first layer welded to said housing outer layer within said aperture and disposed on said housing along said housing length, and the elongated strip having a second layer bonded to the first layer; and
    a compression member disposed to engage said housing first end and be disposed to engage said elongated strip second layer to be unidirectionally movable along said housing length, and provide compression to opposing outer surfaces of said housing along said length with advancement thereon to selectively reduce said housing volume.

* * * * *